US009225860B2

(12) United States Patent
Kuroyanagi

(10) Patent No.: US 9,225,860 B2
(45) Date of Patent: Dec. 29, 2015

(54) INFORMATION PROCESSING APPARATUS, INFORMATION PROCESSING SYSTEM, DISPLAY CONTROL METHOD, AND DISPLAY CONTROL PROGRAM

(71) Applicant: Tomohiro Kuroyanagi, Kanagawa (JP)

(72) Inventor: Tomohiro Kuroyanagi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/157,652

(22) Filed: Jan. 17, 2014

(65) Prior Publication Data

US 2014/0204416 A1    Jul. 24, 2014

(30) Foreign Application Priority Data

Jan. 24, 2013    (JP) ................................. 2013-011148

(51) Int. Cl.
*G06F 3/12*    (2006.01)
*H04N 1/00*    (2006.01)
*G06K 15/00*    (2006.01)

(52) U.S. Cl.
CPC .......... *H04N 1/00408* (2013.01); *G06F 3/1204* (2013.01); *G06F 3/1255* (2013.01); *G06F 3/1256* (2013.01); *G06F 3/1292* (2013.01); *H04N 1/00129* (2013.01); *H04N 1/00464* (2013.01); *H04N 1/00466* (2013.01); *H04N 1/00474* (2013.01); *H04N 2201/0075* (2013.01); *H04N 2201/0094* (2013.01)

(58) Field of Classification Search
CPC .......................... H04N 1/00466; G06F 3/1255
See application file for complete search history.

(56) References Cited

U.S. PATENT DOCUMENTS

| 2005/0200881 A1* | 9/2005 | Yamade ........................ 358/1.14 |
|---|---|---|
| 2006/0010332 A1 | 1/2006 | Nakamura et al. |
| 2007/0109575 A1* | 5/2007 | Salgado et al. .............. 358/1.13 |
| 2009/0268241 A1* | 10/2009 | Choi et al. .................... 358/1.15 |
| 2009/0296126 A1* | 12/2009 | Jang ............................. 358/1.13 |
| 2010/0271661 A1* | 10/2010 | Ogino ........................... 358/1.15 |
| 2011/0055764 A1 | 3/2011 | Akuzawa |

(Continued)

FOREIGN PATENT DOCUMENTS

| EP | 2 284 687 A2 | 2/2011 |
|---|---|---|
| JP | 2000-165419 | 6/2000 |

(Continued)

OTHER PUBLICATIONS

Extended Search Report issued Dec. 19, 2014 in European Patent Application No. 14151888.6.

*Primary Examiner* — Dov Popovici
(74) *Attorney, Agent, or Firm* — Oblon, McClelland, Maier & Neustadt, L.L.P.

(57) ABSTRACT

An information processing apparatus, information processing system, display control method, and display control program stored on a recording medium, each of which receives a user input that instructs specific operation to be performed on an information apparatus, transmits information regarding the specific operation instructed by the user input to the information apparatus via the network, predicts an execution result of the specific operation to be performed on the information apparatus based on the user input to generate a predicted execution result, and displays information reflecting the predicted execution result as a response to the user input, prior to receiving a response including an actual execution result of the specific operation that is performed on the information apparatus from the information apparatus via the network.

13 Claims, 17 Drawing Sheets

(56) References Cited

U.S. PATENT DOCUMENTS

2012/0023451 A1 1/2012 Kuroyanagi
2012/0212761 A1 8/2012 Kuroyanagi

FOREIGN PATENT DOCUMENTS

JP 2006-053902 2/2006
JP 2007-213226 8/2007

* cited by examiner

FIG. 6

| PREDICTED SETTINGS DATA | SETTINGS OPERATION | | | | | | | |
|---|---|---|---|---|---|---|---|---|
| | MIXED SIZE | NON-STANDARD SIZE DOCUMENT | STANDARD SIZE DOCUMENT | ORIENTATION, CAN READ | ORIENTATION, CANNOT READ | SPREAD | STAPLE | ... |
| MIXED SIZE | – | PRO-HIBITED | PROHIBITED | OK | OK | OK | OK | ... |
| NON-STANDARD SIZE DOCUMENT | PRO-HIBITED | – | | OK | OK | OK | OK | ... |
| STANDARD SIZE DOCUMENT | PRO-HIBITED | | – | | OK | OK | OK | ... |
| ORIENTATION, CAN READ | OK | OK | OK | – | OK | OK | OK | ... |
| ORIENTATION, CANNOT READ | OK | OK | OK | OK | – | PRO-HIBITED | PRO-HIBITED | ... |
| SPREAD | OK | OK | OK | OK | PRO-HIBITED | – | OK | ... |
| STAPLE | OK | OK | OK | OK | PRO-HIBITED | OK | – | ... |
| ... | ... | ... | ... | ... | ... | ... | ... | ... |

CURRENT SETTINGS

FIG. 7A

| PREDICTED SETTINGS DATA | SETTINGS OPERATION | | | | | | | |
|---|---|---|---|---|---|---|---|---|
| | MIXED SIZE | NON-STANDARD SIZE DOCUMENT | STANDARD SIZE DOCUMENT | ORIENTATION, CAN READ | ORIENTATION, CANNOT READ | SPREAD | STAPLE | ... |
| CURRENT SETTINGS | | | | | | | | |
| MIXED SIZE | A-1 | B-1 | C-1 | D-1 | E-1 | F-1 | G-1 | ... |
| NON-STANDARD SIZE DOCUMENT | A-2 | B-2 | C-2 | D-2 | E-2 | F-2 | G-2 | ... |
| STANDARD SIZE DOCUMENT | A-3 | B-3 | C-3 | D-3 | E-3 | F-3 | G-3 | ... |
| ORIENTATION, CAN READ | A-4 | B-4 | C-4 | D-4 | E-4 | F-4 | G-4 | ... |
| ORIENTATION, CANNOT READ | A-5 | B-5 | C-5 | D-5 | E-5 | F-5 | G-5 | ... |
| SPREAD | A-6 | B-6 | C-6 | D-6 | E-6 | F-6 | G-6 | ... |
| STAPLE | A-7 | B-7 | C-7 | D-7 | E-7 | F-7 | G-7 | ... |
| ... | ... | ... | ... | ... | ... | ... | ... | — |

FIG. 7B

| ATTRIBUTE DATA ID | ATTRIBUTE DATA |
|---|---|
| A-1 | - |
| A-2 | CANNOT SET WITH NON-STANDARD SIZE DOCUMENT |
| A-3 | CANNOT SET WITH STANDARD SIZE DOCUMENT |
| ⋮ | ⋮ |
| G-5 | CANNOT SET WITH CURRENT ORIENTATION |
| G-6 | - |
| G-7 | - |
| ⋮ | ⋮ |

FIG. 9A

| SET VALUE | PROBABILITY |
|---|---|
| MIXED SIZE | 12/12 |
| NON-STANDARD SIZE DOCUMENT | 5/5 |
| STANDARD SIZE DOCUMENT | 3/3 |
| ORIENTATION, CAN READ | 18/18 |
| ORIENTATION, CANNOT READ | 2/2 |
| SPREAD | 9/10 |
| STAPLE | 6/11 |
| PUNCH | 7/11 |
| ⋮ | ⋮ |

FIG. 9B

| PROBABILITY | ICON |
|---|---|
| 100% | ◎ |
| 90-100% | ○ |
| 0-90% | ▲ |

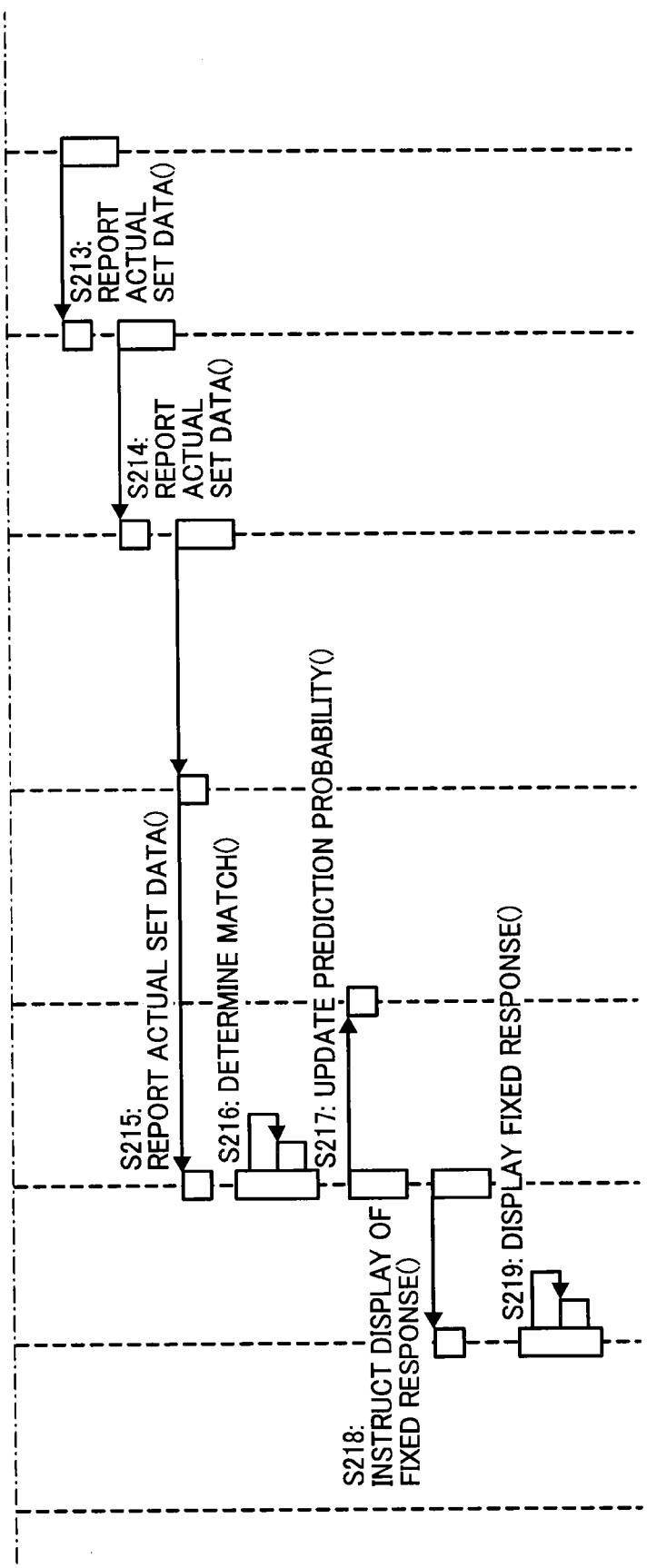

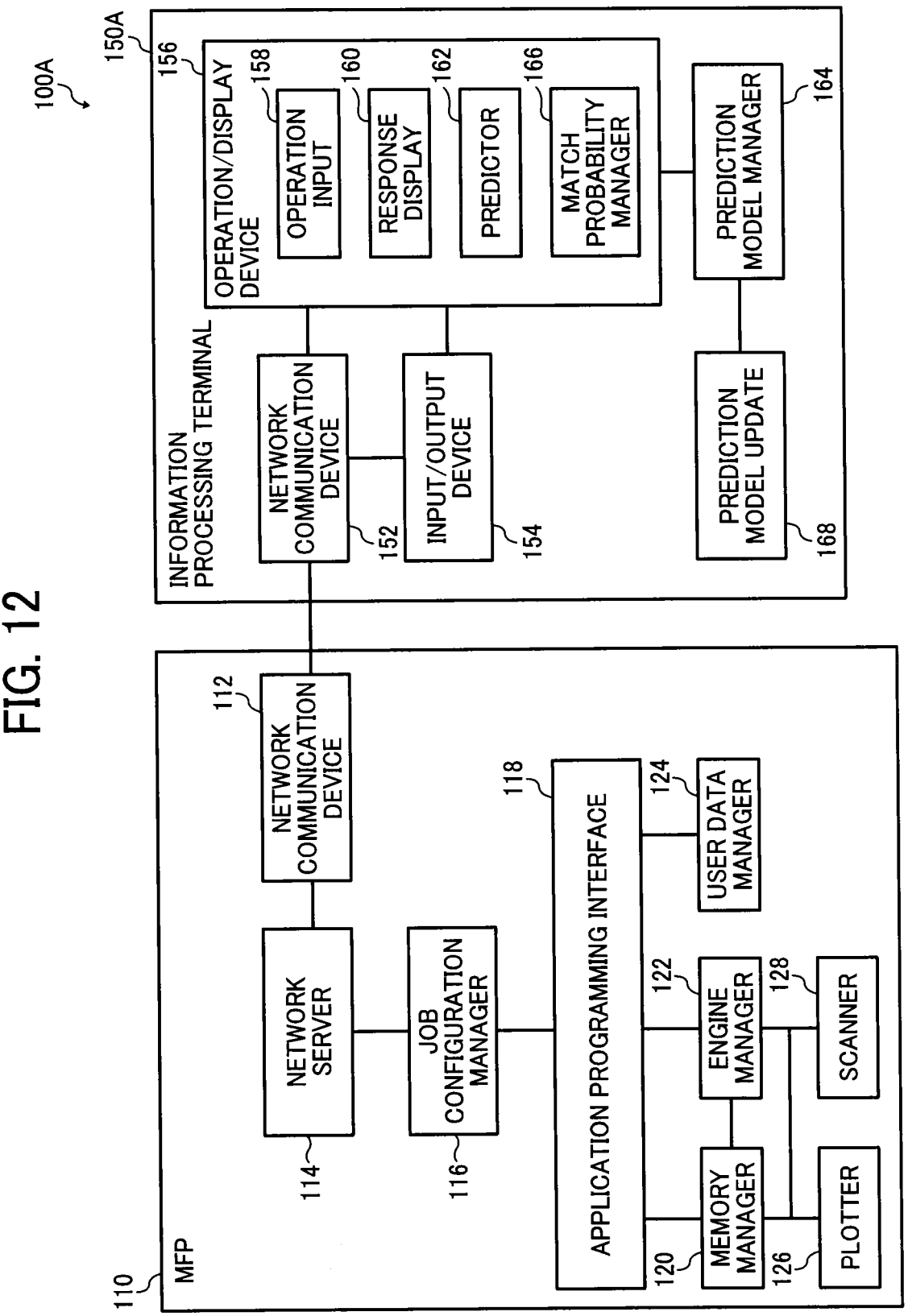

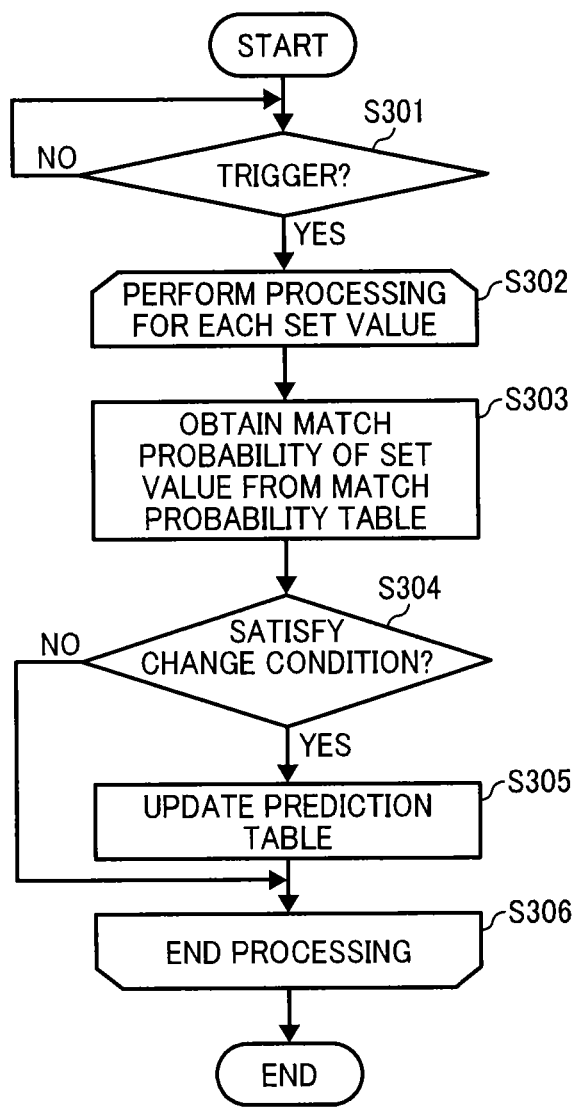

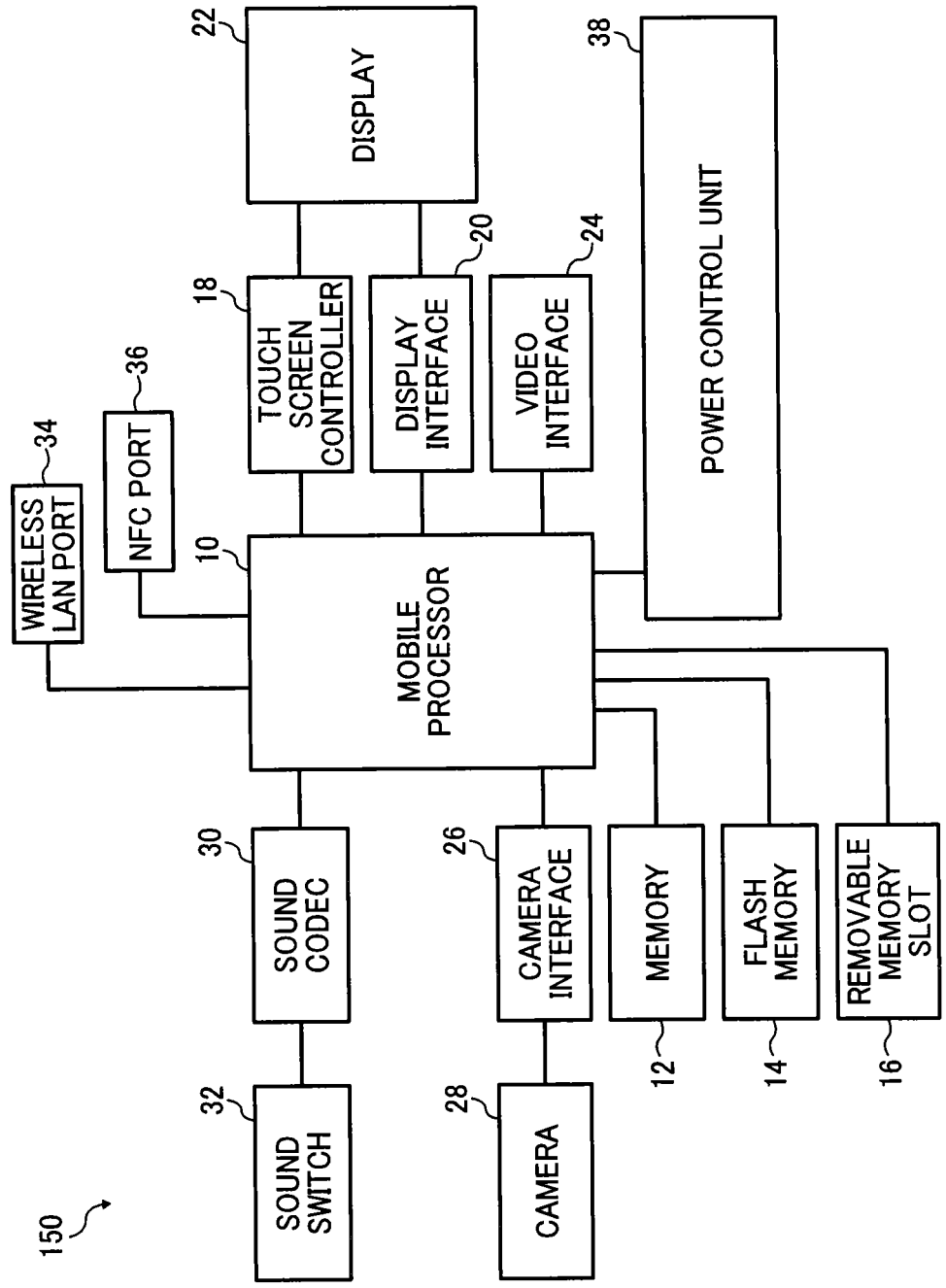

INFORMATION PROCESSING APPARATUS, INFORMATION PROCESSING SYSTEM, DISPLAY CONTROL METHOD, AND DISPLAY CONTROL PROGRAM

CROSS-REFERENCE TO RELATED APPLICATIONS

This patent application is based on and claims priority pursuant to 35 U.S.C. §119 to Japanese Patent Application No. 2013-011148, filed on Jan. 24, 2013, in the Japan Patent Office, the entire disclosure of which is hereby incorporated by reference herein.

BACKGROUND

1. Technical Field

The present invention generally relates to controlling display of a user interface, and more specifically to an information processing apparatus, an information processing system, a display control method, and a display control program stored in a recording medium, each of which is capable of controlling display of a user interface at the information processing apparatus.

2. Description of the Related Art

The recent information processing apparatuses such as a personal computer or a portable information processing terminal are used to remotely control an information apparatus by communicating data using such as a hypertext transfer protocol (HTTP). For example, in case of remotely setting a value of a specific item on the information apparatus using the information processing apparatus, the information processing apparatus may send information regarding a set value to the information apparatus every time such value is set at the information processing apparatus, and display a result based on a response from the information apparatus. Alternatively, the information processing apparatus may send information regarding a plurality of set values to the information apparatus at once to reflect the result of setting the set values at once.

SUMMARY

Example embodiments of the present invention include an information processing apparatus, information processing system, display control method, and display control program stored on a recording medium, each of which receives a user input that instructs specific operation to be performed on an information apparatus, transmits information regarding the specific operation instructed by the user input to the information apparatus via the network, predicts an execution result of the specific operation to be performed on the information apparatus based on the user input to generate a predicted execution result, and displays information reflecting the predicted execution result as a response to the user input, in prior to receiving a response including an actual execution result of the specific operation that is performed on the information apparatus from the information apparatus via the network.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 6 is an example data structure of a prediction model stored in a memory of the information processing terminal of FIG. 2;

FIGS. 7A and 7B are an example data structure of the prediction model stored in the memory of the information processing terminal of FIG. 2;

FIG. 9A is an example data structure of a match probability table, stored in the memory of the information processing terminal of FIG. 2;

FIG. 9B is an example data structure of an appearance correspondence table, stored in the memory of the information processing terminal of FIG. 2;

FIGS. 11A and 11B are a data sequence diagram illustrating operation of controlling display of a user interface at the information processing terminal, performed by the information processing terminal in cooperation with the image processing apparatus of FIG. 2, according to an example embodiment of the present invention;

FIG. 12 is a functional structure of the image processing system of FIG. 1 including an information processing terminal and the image processing apparatus of FIG. 2, according to an example embodiment of the present invention;

FIG. 13 is a flowchart illustrating operation of updating a prediction model, performed by the information processing terminal of FIG. 12, according to an example embodiment of the present invention; and FIG. 14 is a hardware structure of the information processing terminal of the image processing system of FIGS. 2 and 12.

Figure 1:
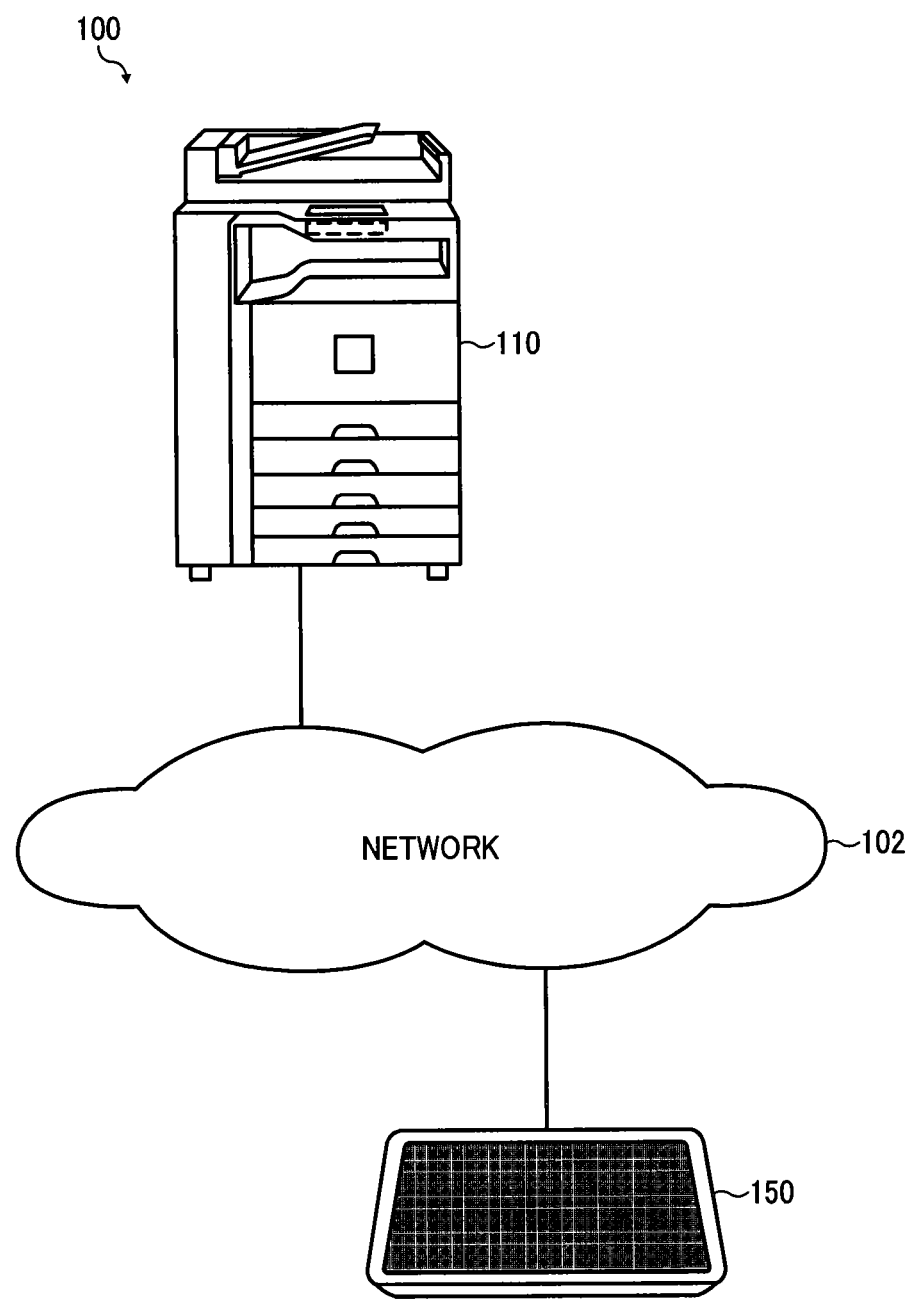
FIG. 1 is a schematic block diagram illustrating a configuration of an image processing system according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

In the following example embodiments, an image processing system including an image processing apparatus and an information processing terminal is described as an example of an information processing system. The image processing apparatus, such as a multifunctional peripheral (MFP), is an example of an information apparatus. The information processing terminal is an example of an information processing apparatus that allows the user to remotely operate the information apparatus such as the image processing apparatus.

FIG. 1 illustrates a configuration of an image processing system 100 according to an example embodiment of the present invention. The image processing system 100 of FIG. 1 includes a MFP 110 and an information processing terminal 150, which are connected through a network 102. The network 102 includes various wired or wireless networks, which allow communication between or among apparatuses, such as a local area network (LAN), wide area network (WAN), the Internet, or personal area network (PAN). In this example, the MFP 110 and the information processing terminal 150 may be provided at any desired locations, as long as they are communicable via a predetermined network using a predetermined communications protocol. For example, the MFP 110 and the information processing terminal 150 may be provided at different locations that are physically apart from each other, or may be provided at the same locations such as in the same room.

The MFP 110 and the information processing terminal 150 may each be implemented by an apparatus independent from each other. However, it is technically possible to incorporate the functions of the information processing terminal 150 to be incorporated into the MFP 110, for example, as a control system that controls operation of the MFP 110.

The MFP 110 provides various image processing functions such as copy function, scan function, facsimile function, and print function. In this example, the MFP 110 is a subject for control by the information processing terminal 150. More specifically, the information processing terminal 150 functions as an operation device that a user operates to control the MFP 110. In one example, the information processing terminal 150 may be implemented by a general-purpose operation device having a user interface, such as a personal computer including a notebook computer or a tablet computer, a smart phone, or a personal digital assistant (PDA). Alternatively, the information processing terminal 150 may be implemented by a dedicated operation device specially designed for the MFP 110 to operate the MFP 110. As described above, the information processing terminal 150 may be mounted on or provided in the MFP 110.

The information processing terminal 150 receives a user instruction for setting one or more specific image processing functions of the MFP 110 from the user, and notifies the user of information regarding the set image processing functions of the MFP 110. The MFP 110 receives the user instruction for setting the image processing functions of the MFP 110 from the information processing terminal 150, performs operation of setting the image processing functions, and sends an execution result of setting the image processing functions to the information processing terminal 150. More specifically, the execution result indicates whether setting of the specific image processing functions is successful. This process of communicating between the information processing terminal 150 and the MFP 110 to set image processing functions according to the user instruction is so-called settings operation.

In case the information processing terminal 150, which is independent of the MFP 110, remotely controls settings operation with respect to the MFP 110, the MFP 110 and the information processing terminal 150 communicate with each other to perform settings operation, using the predetermined communications protocol. For example, in case of remotely controlling settings operation using the hypertext transfer protocol (HTTP), the information processing terminal 150 communicates with the MFP 110 each time a user instruction for setting a specific item is received at the information processing terminal 150, for example, through a transaction of a HTTP request and a HTTP response. Depending on a condition of the network that connects the MFP 110 and the information processing terminal 150 or a communications protocol used for communication, the response that is sent from the MFP 110 in response to the request from the information processing terminal 150 may delay, thus causing a slow response with respect to the user instruction regarding the settings operation. With this delay, the user at the information processing terminal 150 may press the same key more than once, thus lowering efficiency in settings operation.

Alternatively, the information processing terminal 150 may send information regarding a plurality of items that the user instructed to set for a predetermined time period to the MFP 110 at once, and reflect setting of the plurality of items at once based on a response from the MFP 110. While this may reduce a data traffic, an error in settings operation is reflected at the information processing terminal 150, only after the information processing terminal 150 receives the response from the MFP 110. This may require the user to re-enter a set value, while some items may not be set due to an error at the MFP 110. Further, if the user cancels or modifies a set value at the information processing terminal 150, such change is not timely reflected at the information processing terminal 150 as the information processing terminal 150 displays information only after it receives a response from the MFP 110.

In view of the above, in the following example embodiments, while waiting for a response from the MFP 110 in response to a request for setting items on the MFP 110, the information processing terminal 150 predicts a result of executing settings operation at the MFP 110 in response to that request, and displays information based on the predicted execution result. Accordingly, the information processing terminal 150 displays information based on a predicted execution result, in response to the user instruction more quickly, even in case the response indicating the actual execution result from the MFP 110 is delayed. With a faster response to the user instruction, the user at the information processing terminal 150 is suppressed from repeatedly pressing the same key.

Referring now to FIGS. 2 to 11, operation of controlling display of a user interface at the information processing terminal 150, performed by the image processing system 100 of FIG. 1, is explained according to an example embodiment of the present invention.

Figure 2:
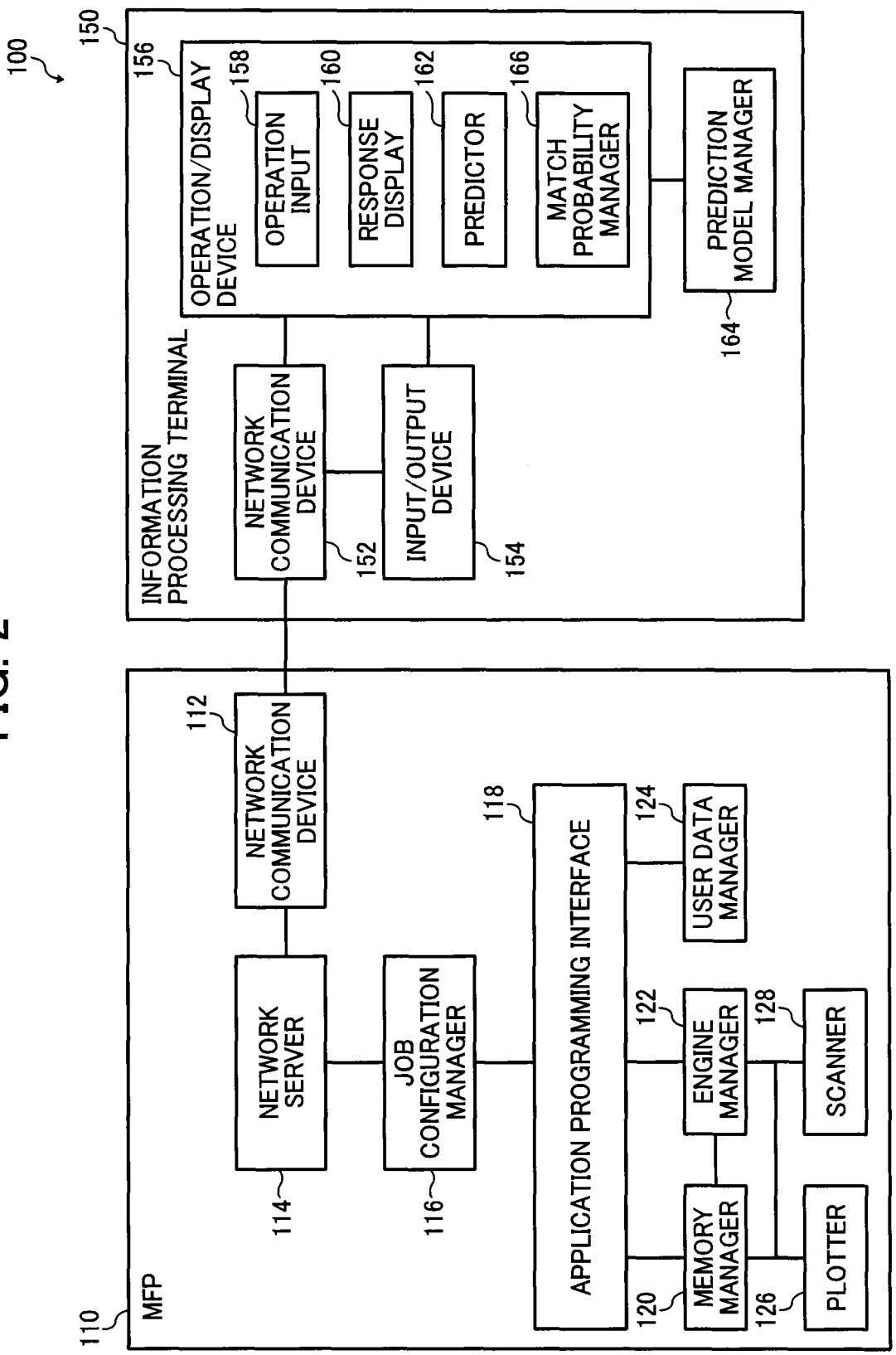
FIG. 2 is a schematic block diagram illustrating a functional structure of the image processing system of FIG. 1 including an information processing terminal and an image processing apparatus, according to an example embodiment of the present invention.

FIG. 2 is a schematic block diagram illustrating a structure of the image processing system 100 of FIG. 1, according to an example embodiment of the present invention. More specifically, FIG. 2 illustrates a functional structure of a selected portion of the MFP 110 and a functional structure of a selected portion of the information processing terminal 150, which relate to controlling display of a user interface.

The MFP 110 includes a network communication device 112, a network server 114, a job configuration manager 116, an application programming interface (API) 118, a memory manager 120, an engine manager 122, a user data manager 124, a plotter 126, and a scanner 128.

The network communication device 112 is implemented by, for example, a network interface circuit, and transmits or receives data through the network 102 using a communications protocol such as Transmission Control Protocol/Internet Protocol (TCP/IP). The network server 114 analyzes data to be transmitted or received through the network communication device 112, and controls transmission or reception of data with respect to the outside apparatus. For example, the network server 114 may be implemented by a web server based on httpd, such as a HTTP daemon. The network server 114 executes processing according to a HTTP request received from a HTTP client, and responds an execution result of processing the HTTP request to the HTTP client.

The plotter 126 performs image forming operation using image forming devices such as a photoconductor, an image developing device, a transfer device, etc. in response to an instruction for printing that is generated by a print application. The scanner 128 performs image reading operation using a scanner that scans an original image into image data, in response to an instruction for scanning that is generated by a scan application.

The memory manager 120 controls operation with respect to a memory of the MFP 110, for example, in the process of image forming or image reading. For example, the memory manager 120 reserves or releases an image memory space, or compresses or expands image data in the memory.

The engine manager 122 manages hardware resources such as the plotter 126 or the scanner 128, to control image forming operation or image reading operation.

The user data manager 124 manages various user-specific data such as an address book of each user, user authentication data, or user authorization data.

The memory manager, engine manager, and user data manager may be implemented by a processor that operates in cooperation with a memory according to various programs.

The API 118 is provided between a platform layer including the components 120 to 124 (that is, the memory manager 120, engine manager 122, and user data manager 124), and an upper layer including application such as print application and scan application. The API 118 transfers various processing requests from the upper layer, to the components 120 to 124 of the platform layer, using a predetermined functional module.

The job configuration manager 116 manages settings information regarding one or more items to be set for a job to be performed. The job configuration manager 116 may be implemented by a processor that operates in cooperation with the memory. Examples of the job include, but not limited to, a print job to be performed in response to a print instruction, a scan job to be performed in response to a scan instruction, and a copy job to be performed in response to a copy instruction. For the copy job, the settings information indicates selection of a sheet tray, selection of a discharge tray, whether to combine a multiple pages into one page, image size enlargement or reduction, post processing to be performed such as sorting or stapling, etc. The job configuration manager 116 communicates with the memory manager 120, engine manager 122, and/or user data manager 124 via the API 118 to obtain information managed by at least one of these components. Using the obtained information, the job configuration manager 116 determines whether settings operation can be executed according to the user instruction for setting, which is received from the information processing terminal 150. The job configuration manager 116 executes settings operation based on a determination result indicating whether settings operation can be executed, and sends the execution result to the information processing terminal 150 through the network communication device 112 and the network server 114.

In this example illustrated in FIG. 2, the job configuration manager 116 functions as a manager that manages execution of settings operation. The network communication device 112 and the network server 114 function as a receiver that receives a user instruction regarding settings operation from the information processing terminal 150, and a transmitter that transmits an execution result of executing settings operation to the information processing terminal 150.

The MFP 110 has a hardware structure that is substantially similar to that of a known MFP, such that its explanation is omitted.

Still referring to FIG. 2, the information processing terminal 150 includes a network communication device 152, an input/output device 154, an operation/display device 156, and a prediction model manager 164.

The network communication device 152, which may be implemented by a network interface circuit, transmits or receives data through the network 102 using a communications protocol such as TCP/IP.

The input/output device 154 includes an input device such as a keyboard, a touch panel, and/or a microphone, and an output device such as a display that may be an external display or an incorporated display, and/or a speaker. The input/output device 154 receives a user input through the input device, or displays a processing result thorough the output device.

The operation/display device 156 controls transmission or reception of data regarding settings operation transmitted through the network communication device 152. The operation/display device 156 operates in cooperation with the input/output device 154 to provide a user interface that allows the user to instruct settings operation. For example, the operation/display device 156 may be implemented by a web browser that performs operation based on HTML data received from the MFP 110. Alternatively, the operation/display device 156 may be implemented by a dedicated application that functions as a HTTP client that processes data to be transmitted or received using the HTTP.

In this example, the operation/display device 156 receives settings operation screen data that allows the user to input information regarding various settings for the MFP 110, from the MFP 110. Based on the settings operation screen data, the operation/display device 156 causes the input/output device 154 to display a settings operation screen.

The operation/display device 156 receives a user input that inputs or selects a set value of an item with respect to the settings operation screen, through the input/output device 154. The operation/display device 156 transmits information regarding the item to be set to the MFP 110 through the network communication device 152. The operation/display device 156 causes the input/output device 154 to display a predicted result of settings operation, that is, a predicted result of setting the set value, based on a prediction model managed by the prediction model manager 164.

The prediction model manager 164 manages the prediction model, which is used to predict an execution result of executing settings operation by the MFP 110 in response to the user input regarding settings operation. The prediction model memory 164 may be implemented by a processor that operates in cooperation with a memory area of a supplemental memory such as a hard disk drive (HDD), solid state drive (SSD), or flash memory.

In this example, the operation/display device 156 may be implemented by a processor such as a CPU, which operates in cooperation with a display such as a touch panel that functions as the input/output device 154. More specifically, the operation/display device 156 includes an operation input 158, a response display 160, a predictor 162, and a match probability manager 166.

The operation input 158 receives a user input for instructing the MFP 110 to execute settings operation, such as selection of a set value of an item being displayed on the settings operation screen. In response to the user input, the operation input 158 transmits information regarding a set value of the item to be set to the MFP 110 through the network communication device 152, as well as to the predictor 162. The operation input 158, with the input/output device 154, thus performs the inputting function. The operation input 158, with the communication device 152, thus performs the transmitting function.

The predictor 162 refers to the prediction model stored in the memory and managed by the prediction model manager 164 to predict an execution result of settings operation, which is being performed at the MFP 110 based on the information regarding a set value of the item. The predicted execution result generated by the predictor 162 is output to the response display 160.

The response display 160 causes the display, such as the touch panel, functioning as the input/output device 154 to display a predicted response with respect to the user input regarding settings operation, based on the predicted execution result generated by the predictor 162, in prior to receiving a response from the MFP 110. When the response display 160 receives a response indicating the actual execution result of the settings operation from the MFP 110, the response display 160 obtains the difference between the actual execution result and the predicted execution result, and updates the predicted execution result on the display to reflect the actual execution result when there is any difference. More specifically, the predicted execution result will be changed to reflect the actual execution result. Accordingly, the response display 160 performs the display controlling function.

In this example illustrated in FIG. 2, the network communication device 152 and the operation/display device 156 function as a transmitter that sends information regarding settings operation to the MFP 110, and a result receiver that receives an execution result of settings operation from the MFP 110. The input/output device 154 and the operation input 158 performs the input function that accepts the user input that instructs the MFP 110 to perform settings operation. The predictor 162 performs the predicting function that predicts an execution result of settings operation by the MFP 110 based on the user input that instructs settings operation. The input/output device 154 and the response display 160 performs the display control function that displays a predicted response indicating the predicted execution result of settings operation instructed by the user input, based on the predicted execution result predicated by the user input.

Figure 3:
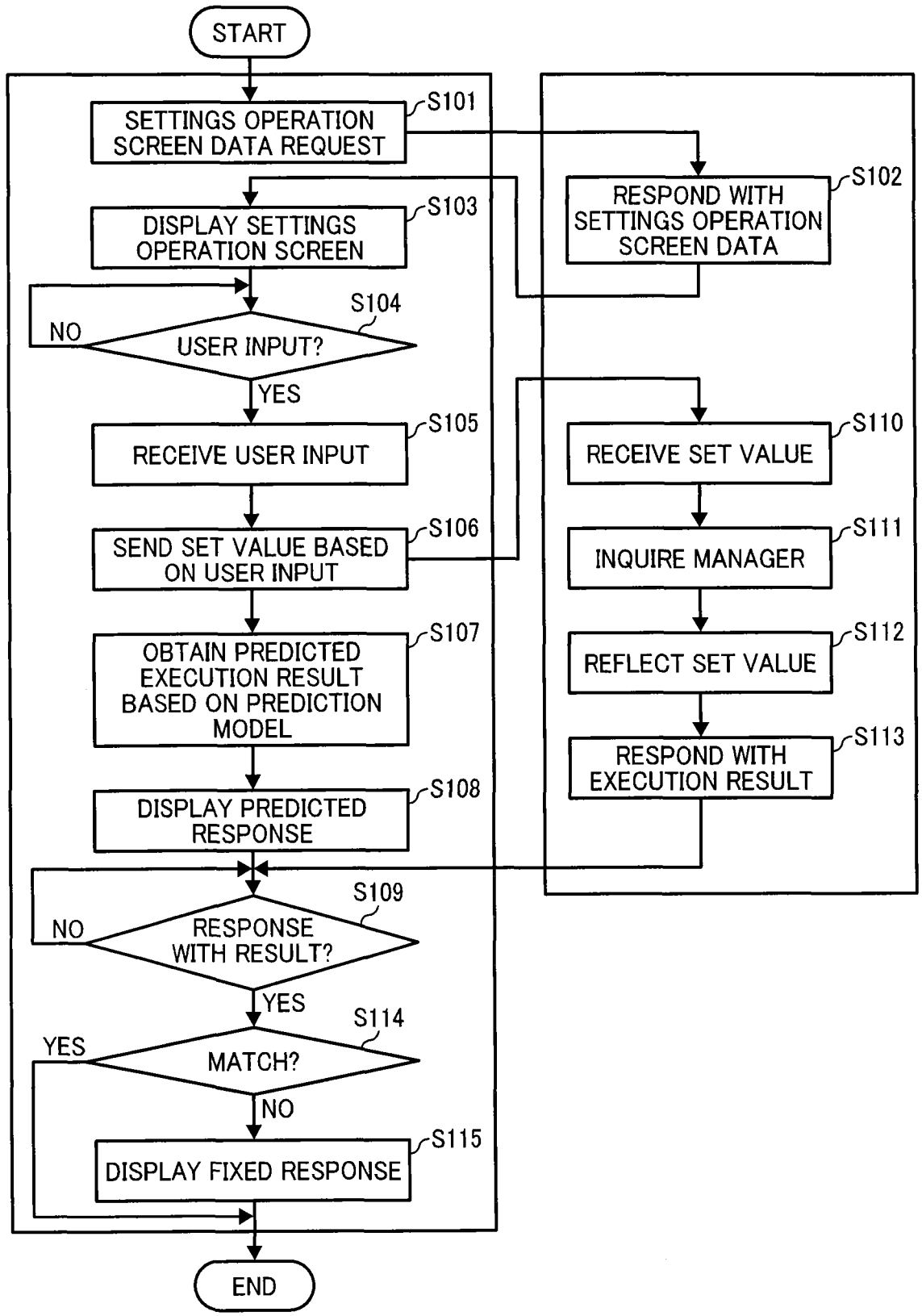
FIG. 3 is a flowchart illustrating operation of controlling display of a user interface at the information processing terminal, performed by the information processing terminal in cooperation with the image processing apparatus of FIG. 2, according to an example embodiment of the present invention.

Referring now to FIGS. 3 to 5, operation of displaying a settings operation screen at the information processing terminal 150, performed by the information processing terminal 150 that operates in cooperation with the MFP 110, is explained according to an example embodiment of the present invention.

FIG. 3 is a flowchart illustrating operation of displaying information regarding a value of an item that is set at the MFP 110, through the display of the information processing terminal 150, performed by the MFP 110 and the information processing terminal 150 that operate in cooperation, according to an example embodiment of the present invention. In FIG. 3, operation performed by the MFP 110 is illustrated at right, and operation performed by the information processing terminal 150 is illustrated at left.

At S101, the network communication device 152 of the information processing terminal 150 requests the MFP 110 for data for displaying a settings operation screen ("settings operation screen data").

At S102, the network communication device 112 of the MFP 110 sends the settings operation screen data to the information processing terminal 150, in response to the request. In this example, the settings operation screen data includes options regarding set values of the respective items on the settings operation screen, currently-set values of the items, and various other data that relate to the settings operation screen.

At S103, the information processing terminal 150 causes the input/output device 154 to display the settings operation screen, based on the settings operation screen data received from the MFP 110.

Figure 4A:
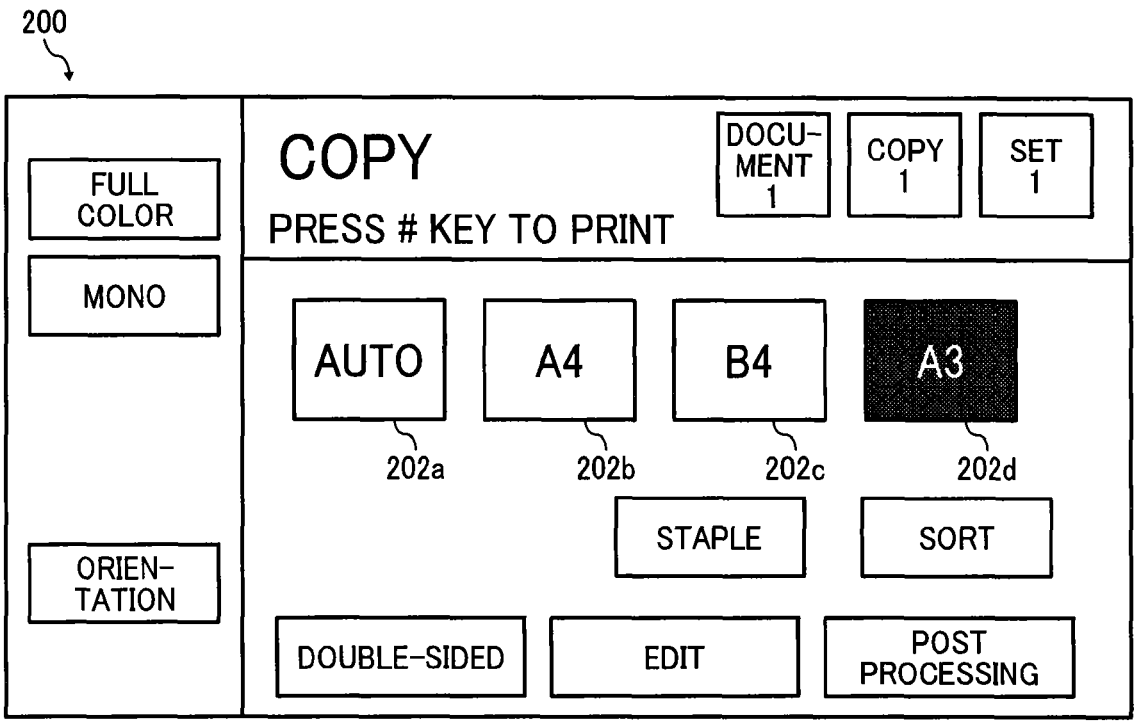
FIGS. 4A to 4C are example settings operation screens, displayed at a display of the information processing terminal of FIG. 2.

FIG. 4A is an example of a settings operation screen 200, which may be displayed on the display of the information processing terminal 150. The settings operation screen 200 of FIG. 4A is designed for setting various items relating to the copy job. The settings operation screen 200 of FIG. 4A includes a plurality of graphical user interface (GUI) components such as the components 202a to 202d, each of which receives a user input for setting the value of an item as well as reflects the currently-set value. For example, the components 202a to 202d each indicate a sheet tray to be selected, such as a type of sheet to be used for copying.

In FIG. 4A, the "A3" tray key 202d is displayed in dark color, indicating that the value "A3" is currently selected for the sheet tray item.

Referring back to FIG. 3, at S104, the operation input 158 of the information processing terminal 150 determines whether a user input is received through the settings operation screen being displayed through the input/output device 154. When it is determined that there is no user input detected at S104 ("NO" at S104), the operation repeats S104 to wait for any user input. When it is determined that the there is a user input detected at S104 ("YES" at S104), the operation proceeds to S105.

At S105, the operation input 158 of the information processing terminal 150 receives a user input that indicates a set value of a specific item that is selected by the user. For example, assuming that the "A4" tray key 202b is selected from the operation settings screen of FIG. 4A, the information processing terminal 150 receives the set value "A4" for the sheet tray item through the operation input 158.

At S106, the information processing terminal 150 sends the set value of the item that is input, to the MFP 110, through the network communication device 152. For example, the set value "A4" for the sheet tray item is transmitted to the MFP 110.

In concurrent with waiting for a response from the MFP 110, at S107, the operation/display device 156 of the information processing terminal 150 instructs the match probability manager 166 to obtain a prediction model stored in the memory 164. Based on the obtained prediction model, the predictor 162 obtains a predicted execution result, which is a prediction of a result to be obtained by the MFP 110 that performs settings operation as requested by the user input.

At S108, the response display 160 of the information processing terminal 150 causes the display, functioning as the input/output device 154, to display a predicted response indicating the predicted execution result of the settings operation as instructed by the user input.

Figure 4B:
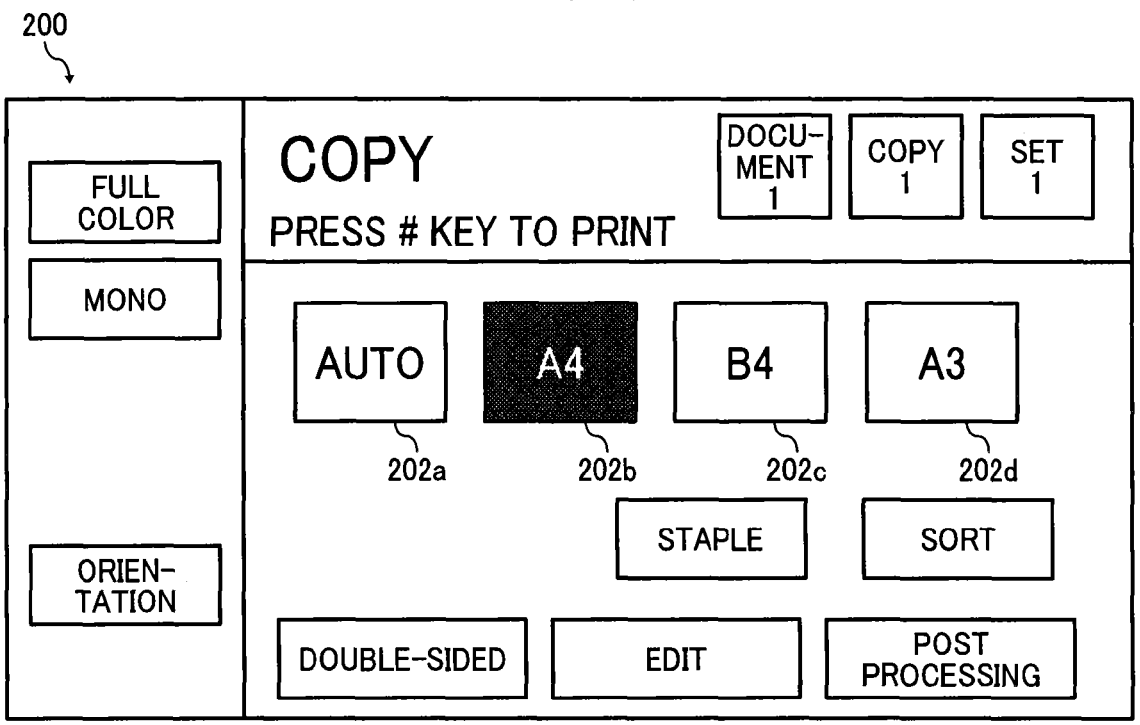

FIG. 4B illustrates an example settings operation screen including the predicted execution result, which is displayed on the display of the information processing terminal 150. As an example of displaying a response based on prediction, the settings operation screen 200 of FIG. 4B specifically illustrates the case in which the "A4" tray key 202b is selected from the settings operation screen of FIG. 4A.

In the settings operation screen 200 of FIG. 4B, in response to the user selection of the "A4" tray key 202b, the "A4" tray key 202b is displayed inverted, indicating that the set value "A4" is predicted to be selected for the sheet tray item.

Figure 4C:
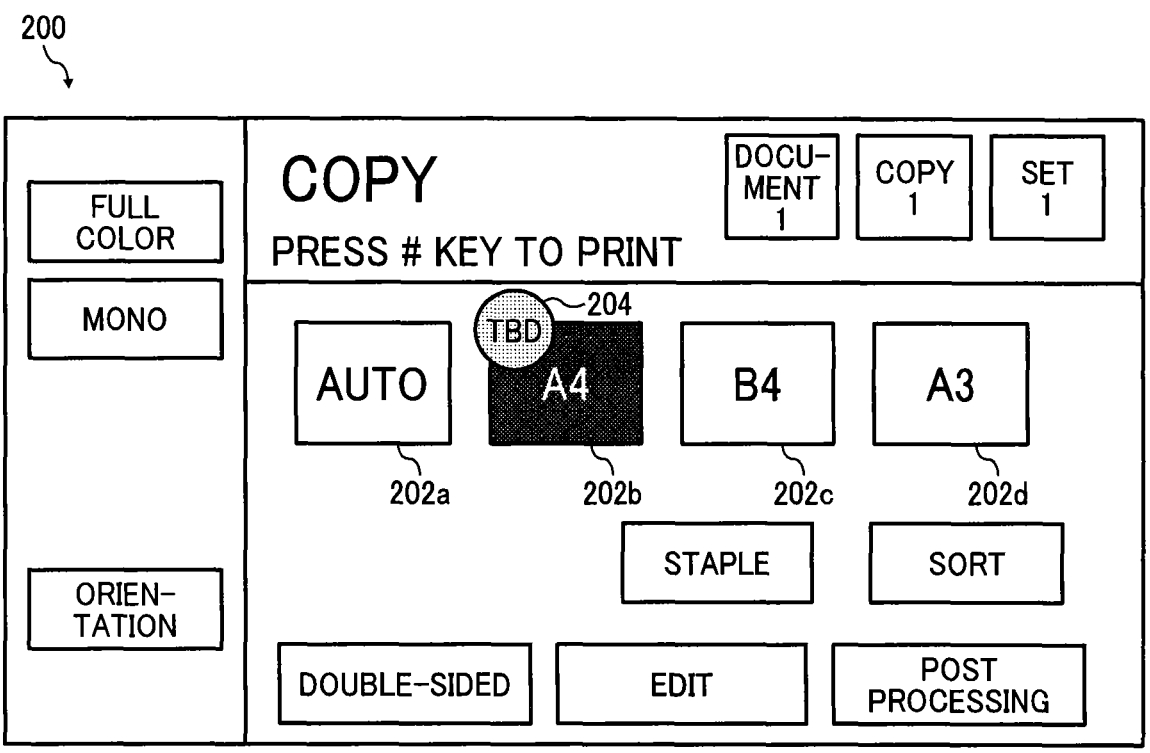

In alternative to displaying the user selection of the "A4" tray key 202b as illustrated in FIG. 4B, the response display 160 may additionally display an icon 204 based on the predicted execution result, until when the information processing terminal 150 receives a response indicating the actual execution result from the MFP 110. In FIG. 4C, the icon 204 "TBD", which stands for "to be decided" indicates that selection of the "A4" tray key 202b is based on prediction. As long as the icon 204 reflects that selection is tentative, any other symbol may be used. Further, in alternative to the icon 204, the response display 160 may display the selected key 202b differently, such as with a bolded line. Alternatively, the response display 160 may display additional information such as a message, a pop-up window, or balloon, which indicates that selection of the tray 202b is tentative.

After the information processing terminal 150 sends information regarding the set value of the set item to be set, to the MFP 110 at S106, the MFP 110 performs S110 to S113.

At S110, the MFP 110 receives the set value of the set item, received from the information processing terminal 150, through the network communication device 112.

At S111, the job configuration manager 116 of the MFP 110 inquires at least one of the memory manager 120, engine manager 122, and user data manager 124, to inquire about various information regarding settings operation to be performed.

At S112, the job configuration manager 1116 of the MFP 110 performs settings operation in which the set value of the set item is analyzed and reflected. In one example, the execution result of the settings operation indicates that setting of the set value is successfully performed. Alternatively, the execution result of the settings operation indicates that setting of the set value is not successfully performed, for example, due to an error. For example, when a sheet tray corresponding to the selected "A4" tray is out of recording sheets, an error is generated. In another example, when stapling or sorting, which corresponds to the "staple" key or the "sort" key, cannot be performed due to a trouble in post processing, an error is generated. This determination is made based on information obtained from any one of the memory manager 120, engine manager 122, and user data manager 124. At S112, the job configuration manager 116 of the MFP 110 obtains the execution result of performing the settings operation at the MFP 110, based on the request received from the information processing terminal 150.

At S113, the MFP 110 sends a response with the execution result of the settings operation, which indicates whether the settings operation is successfully performed at the MFP 110, to the information processing terminal 150 through the network communication device 112.

After displaying the predicted response at S108, the information processing terminal 150 proceeds to perform S109. At S109, the information processing terminal 150 determines whether the response with the execution result is received from the MFP 110, through the network communication device 152. When it is determined that the response with the execution result is not received ("NO" at S109), the operation repeats S109 to keep waiting for the response. When it is determined that the response with the execution result is received ("YES" at S109), the operation proceeds to S114.

At S114, the response display 160 of the information processing terminal 150 compares between the predicted execution result obtained at S107 and the actual execution result received at S109 to determine whether the predicted execution result matches the actual execution result. When it is determined that the predicted execution result matches the actual execution result ("YES" at S114), the operation ends. In such case, the response display 160 of the information processing terminal 150 keeps displaying the predicted execution result on the display. In case the additional icon 204 is displayed as illustrated in FIG. 4C, the response display 160 of the information processing terminal 150 stops displaying the icon 204 to indicate that selection of the "A4" tray key 202b is fixed.

When it is determined that the predicted execution result does not match the actual execution result ("NO" at S114), the operation proceeds to S115. At S115, the response display 160 of the information processing terminal 150 updates the display so as to display the fixed response indicating the actual execution result received from the MFP 110, and the operation ends.

Figure 5A:
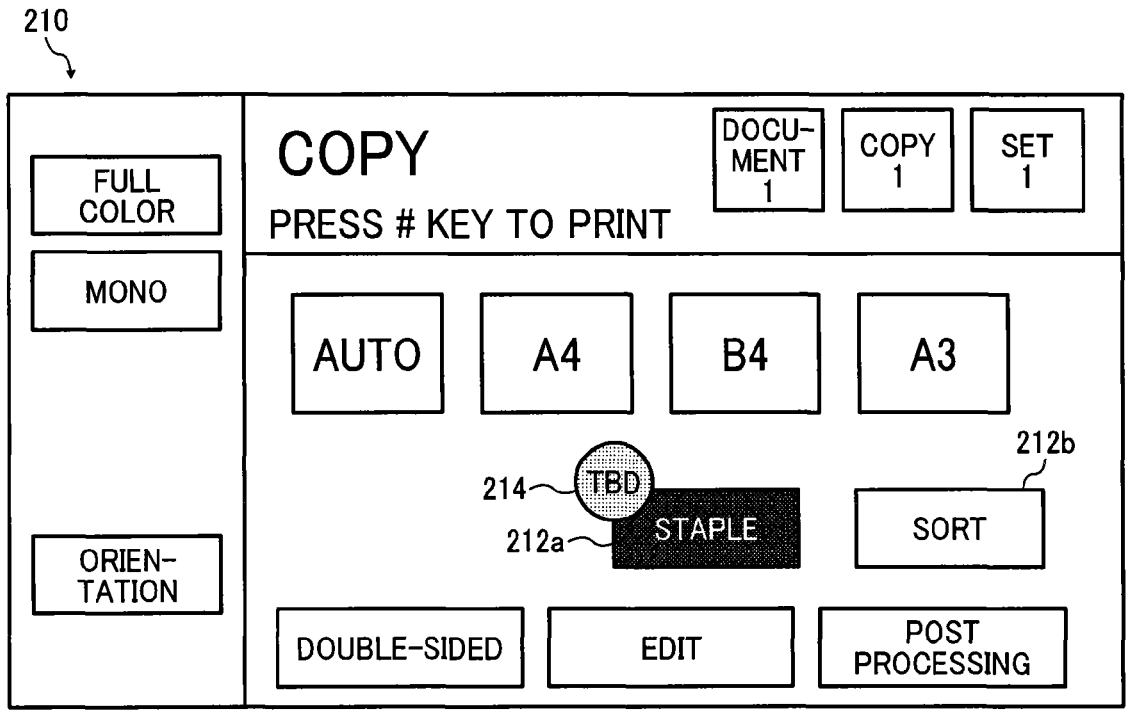
FIGS. 5A and 5B are example settings operation screens, displayed at the display of the information processing terminal of FIG. 2, when a predicted response generated at the information processing terminal differs from a response from the image processing apparatus.
Figure 5B:
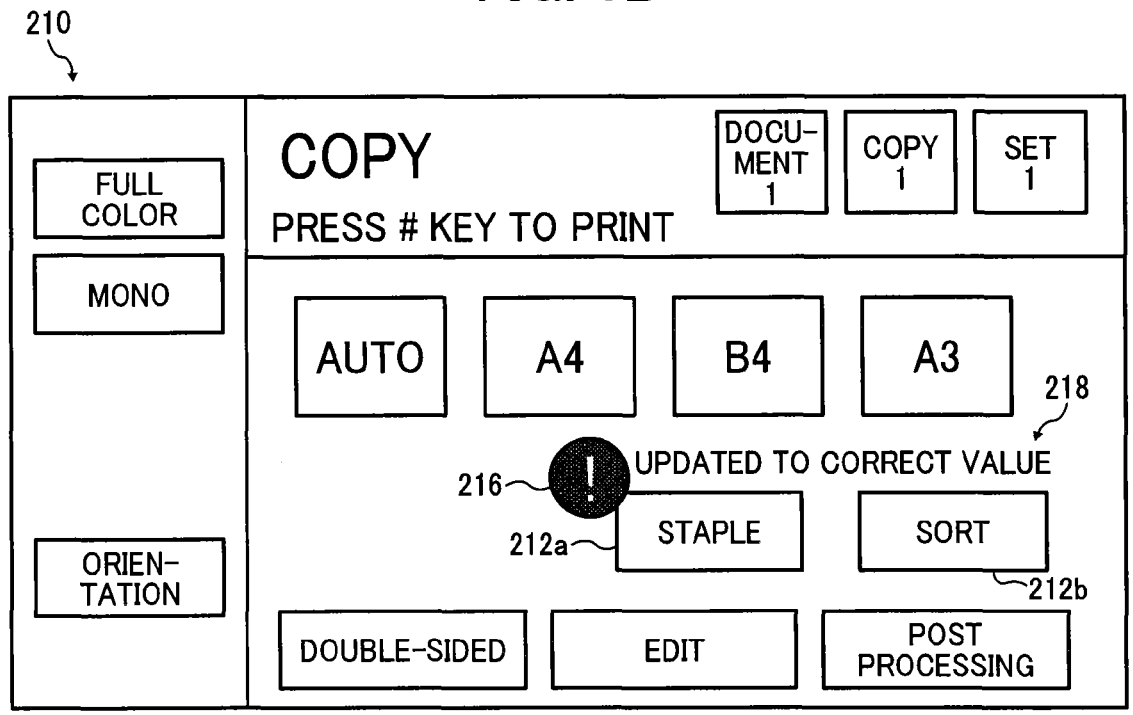

FIGS. 5A and 5B are example settings operation screens, which are sequentially displayed at the information processing terminal 150, when the predicted execution result does not match the actual execution result at S114. FIG. 5A illustrates a settings operation screen 210, which displays the predicted response indicating the predicted execution result of settings operation, according to the user selection of the "staple" key 212a from various GUI components 212 regarding post-processing (such as the "sort" key 212b). With the selection of the "staple" key 212a, the predictor 162 of the information processing terminal 150 predicts that the set value "staple" is set for the set item, and displays the predicted execution result. In this example, the icon 214 is also displayed to indicate that selection of the "staple" key 212a is predicted.

FIG. 5B illustrates the settings operation screen 210, which is displayed at the information processing terminal 150 after the settings operation screen 210, based on the determination result indicating that the predicted execution result does not match the actual execution result received from the MFP 110. Referring to FIG. 5B, when the predicted execution result does not match the actual execution result, the response display 160 of the information processing terminal 150 updates contents of the display so as to reflect the actual set value. In this example of FIG. 5B, the set value "staple" for the post-processing item, which is indicated by the "staple" key 212a, is made unselected.

When updating the display based on the actual execution result, the response display 160 may preferably display an additional text to indicate that display of the predicted result is changed to the fixed result. In this example settings operation screen 210 of FIG. 5B, when the actual execution result indicates that the "staple" key 212a is unselected, which differs from the predicted execution result indicating that the "staple" key 212a is selected, a warning icon 216 and a message 218 indicating that "updated to correct value" are displayed. In alternative to the warning icon 216 and/or the message 218, such additional information may be displayed in various other forms or ways.

Referring now to FIG. 6, a prediction model, which is stored in the memory of the information processing terminal 150 under control of the prediction model manager 163 of FIG. 2 and referred to by the information processing terminal 150 at S107 of FIG. 3, is explained according to an example embodiment of the present invention. FIG. 6 illustrates an example data structure of the prediction model managed by the prediction model manager 163. For each one of current set values of set items ("current settings" in the table), the predicted set value ("predicted settings data" in the cell), is stored in association with each specific settings operation to be performed with respect to the set item ("settings operation" in the table).

Depending on a type of information processing apparatus such as the MFP 110, there may be a combination of set values that cannot be set at the same time. For example, in case of copier such as the MFP 110, as illustrated in FIG. 6, the "non-standard size document" cannot be selected while the "mixed size document" is currently set. As the predicted execution result, selection of the set value "non-standard size document" is prohibited, when the current set value "mixed size document" is selected. In such case, it is predicted that setting of the set value "non-standard size document" fails, resulting in non-selection of the "non-standard size document".

The prediction table of FIG. 6 is one example of a table storing static information indicating possible combinations of set items that cannot be set at the same time, and possible combinations of set items that can be set at the same time. With the prediction table of FIG. 6, the information processing terminal 150 is able to search whether the set value to be set with respect to the current set value is allowed. The prediction model may be implemented in various ways in alternative to the prediction table of FIG. 6, such that the prediction model may be implemented as a program code that includes selecting or determining processing.

Further, in alternative to or in addition to statically defining the possible combinations of set values using the prediction model, the prediction model may dynamically define whether selection of a specific set value should be prohibited, based on collected status information regarding the MFP 110. For example, the status information of the MFP 110 may be collected periodically or at any desired time. For example, the information processing terminal 150 may periodically obtain status information regarding a status of the "A4" sheet tray. Based on the status information, when the "A4" sheet tray is not out of recording sheet, the information processing terminal 150 determines that the set value "A4" can be set. In such case, the predictor 162 of the information processing terminal 150 determines that changing from the currently set value to the set value "A4" is allowed. Based on the status information, when the "A4" sheet tray is out of recording sheet, the set value "A4" cannot be set. In such case, the predictor 162 of the information processing terminal 150 determines that change from the currently set value to the set value "A4" is prohibited.

FIGS. 7A and 7B illustrate an example data structure of the prediction model that may be stored in the memory under control of the prediction model manager 164. FIG. 7A illustrates a prediction index table that associates, for each one of the current set values of set items ("current settings" in the table), an index to attribute data ("predicted settings data" in the cell) when a specific settings operation ("settings operation" in the table) is performed. More specifically, an attribute data identification (ID) is stored in the cell to function as the index. FIG. 7B illustrates an attribute data table that stores attribute data in association with the attribute data ID. In displaying the predicted response, message data to be displayed along with the predicted execution result is generated based on the attribute data.

Figure 8A:
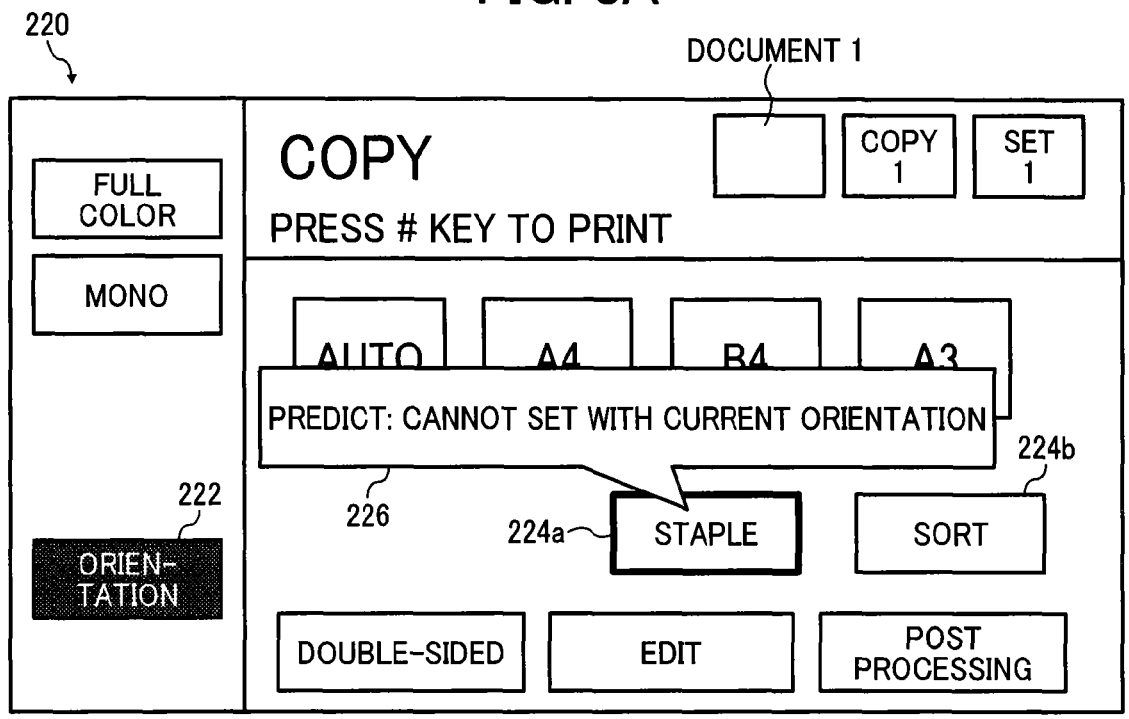
FIGS. 8A and 8B are example settings operation screens including additional information, displayed based on the prediction model of FIGS. 7A and 7B.
Figure 8B:
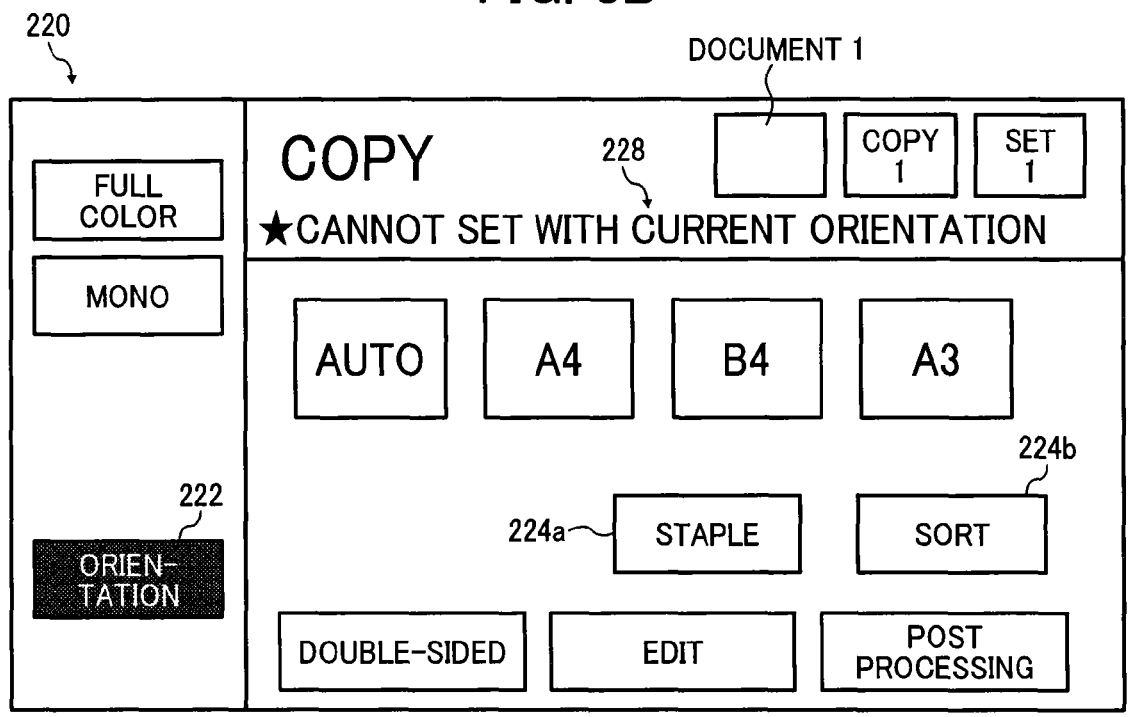

In one example, in response to the user selection at the information processing terminal 150, the response display 160 refers to the prediction model of FIGS. 7A and 7B to obtain the attribute data identified by the attribute data ID. In this manner, additional information based on the attribute data can be displayed as the predicted response. Further, in addition to the attribute data, the response display 160 may obtain the predicted execution result, as described above referring to FIG. 6. In such case, the prediction model of FIG. 7A may additionally store information regarding the predicted execution result in the cell, or the attribute data may include information regarding the predicted execution result. FIGS. 8A and 8B illustrate settings operation screens, when the predicted response is displayed including additional information based on attribute data.

FIG. 8A illustrates an operation settings screen 220, which displays prediction on selection of the "staple" key 224a with additional information, based on the prediction model of FIG. 7, or FIGS. 6 and 7. When the "staple" key 224a is selected while the set value "orientation, cannot read" is made valid as the "orientation" key 222 is selected, the operation settings screen 220 displays the predicted execution result as illustrated in FIG. 8A. In FIG. 8A, the "staple" key 224a is displayed with the border line indicating that selection of the "staple" key 224a is predicted. Further, based on the prediction model, prohibiting selection of the "staple key" 224a is predicted, thus displaying the "staple" key 224a as unselected. While displaying the operation settings screen with the predicted execution result, the response display 160 of the information processing terminal 150 obtains attribute data from the attribute data table of FIG. 7B, using the attribute data ID obtained from the cell of the table of FIG. 7A. More specifically, as illustrated in FIG. 8A, the response display 160 displays a pop-up balloon 226, which indicates that "predict: cannot set with current orientation".

FIG. 8B illustrates an operation settings screen 220, which is updated with the actual execution result received from the MFP 110. In FIGS. 8A and 8B, it is assumed that the predicted execution result matches the actual execution result. In such case, as illustrated in FIG. 8B, the operation settings screen 220 displays a message 228 indicating that "cannot set with current orientation", based on the actual execution result. The "staple" key 224a is displayed as unselected. Further, the pop-up balloon 226 and the border line of the key 224a are not displayed, indicating that display reflects the actual set value.

In this example, any one of the prediction models of FIGS. 6 and 7 may be previously generated by a vender of the MFP 110, based on a specification of the MFP 110. Alternatively, the prediction model may be obtained at any desired time from a server of the vendor through the Internet, for example, so as to keep the prediction model updated.

While the prediction model can be prepared according to the specification of the MFP 110, even with the prediction model, the predicted execution result may not be always accurate as it relates to a current status of the MFP 110 that may vary from time to time. In one example, in order to further improve operability for the user, the operation/display device 156 of FIG. 2 may further include the match probability manager 166.

The match probability manager 166, which may be implemented by the processor that operates in cooperation with any desired memory, stores the match probability indicating a successful rate when the predicted execution result matches the actual execution result received from the MFP 110. In this example, the response display 160 may display the predicted execution result, in a manner that reflects the match probability.

Figure 10:
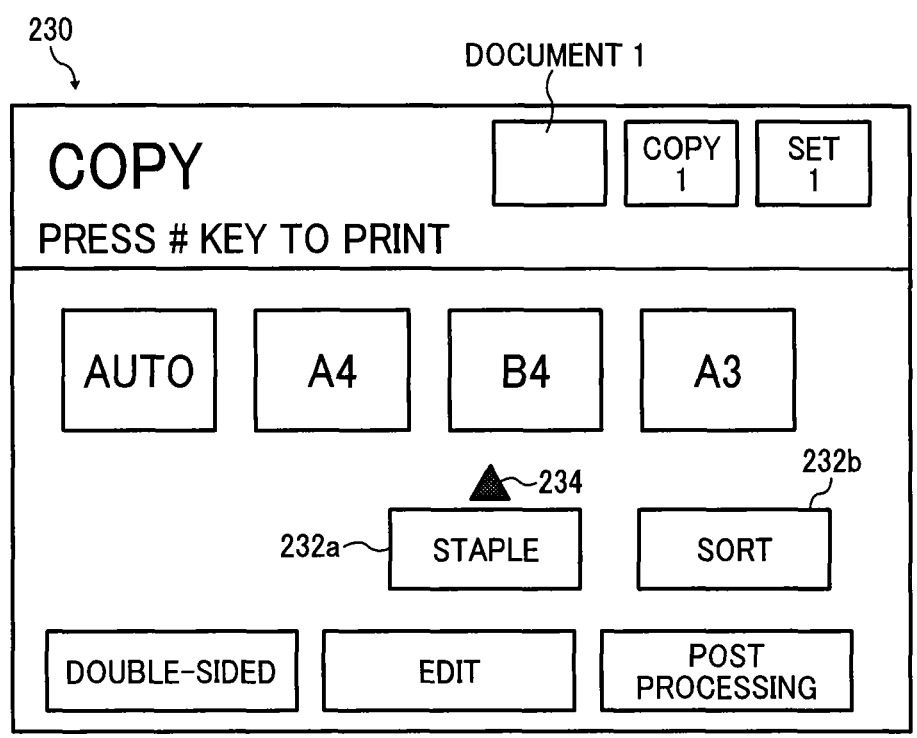
FIG. 10 is an example settings operation screen including additional information indicating the match probability, displayed based on the appearance correspondence table of FIG. 9B.

FIG. 9A illustrates an example data structure of a match probability table. The match probability table of FIG. 9A stores information regarding the match probability in which the predicted execution result matches the actual execution result, when settings operation is predicted to be successful with respect to a request for setting a set value. The match probability is expressed as a ratio between the number of successful results and the total number of predictions. The match probability table is stored in the memory of the information processing terminal 150 under control of the prediction model manager 164. The match probability table is updated when the predicted execution result is compared with the actual execution result that is received from the MFP 110. FIG. 10 is an example settings operation screen including additional information that is generated based on the match probability.

FIG. 9B is an example data structure of an appearance correspondence table, which associates the match probability with an icon. The response display 160 refers to the appearance correspondence table of FIG. 9B to generate and display the icon that matches the match probability obtained from the match probability table of FIG. 9A.

For example, it is assumed that the "staple" 232a is selected from the settings operation screen 230 of FIG. 10. In displaying the predicted execution result in response to selection of the "staple" key 232a, the response display 160 refers to the match probability table of FIG. 9A to obtain the match probability of the set value "staple" is "6/11", which is less than 90%. The response display 160 further refers to the appearance correspondence table of FIG. 9B to obtain the "triangle" icon, which is associated with the match probability of less than 90%. As illustrated in FIG. 10, an icon 234 having the triangle shape is displayed above the "staple" key 232a, which is displayed as unselected. With the additional information indicating the match probability, the user can instantly recognize that selection of the "staple" key 232a may not be accepted at the MFP 110.

In this example illustrated in FIG. 9B, an appearance of additional information to be displayed is changed, specifically, by changing a symbol used for the icon. The appearance of additional information to be displayed is, however, not limited to this example, such that a numerical value or any other design that reflects the match probability may be used.

Figure 11A:
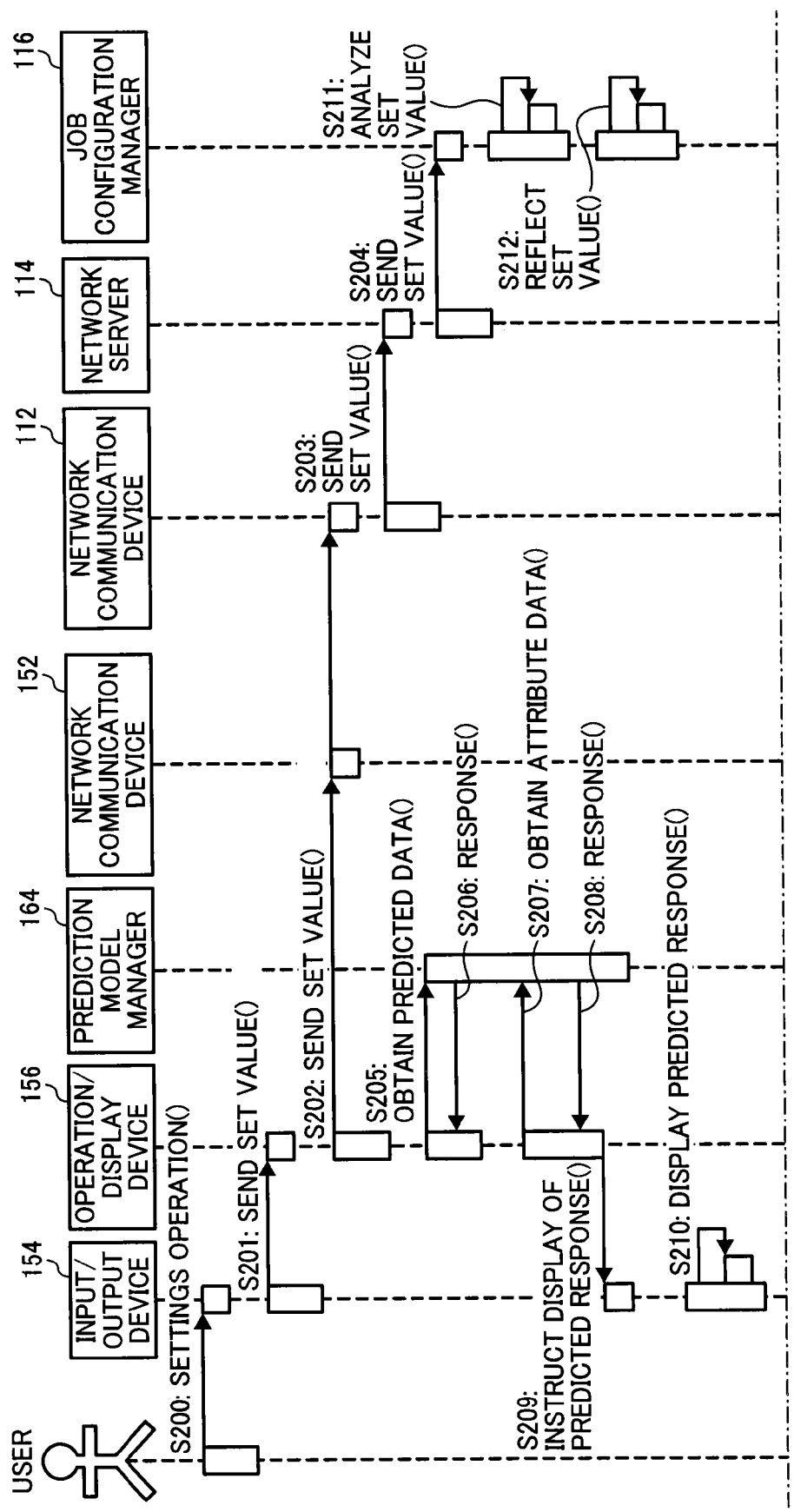

Referring now to FIGS. 11A and 11B (FIG. 11), operation of displaying a user interface related to settings operation, performed by the information processing terminal 150 that operates in cooperation with the MFP 110, is explained according to an example embodiment of the present invention. FIG. 11 illustrates a data sequence diagram illustrating operation of controlling display of a user interface related to settings operation, performed by the MFP 110 and the information processing terminal 150 that communicate with each other via the network 102.

At S200, the information processing terminal 150 receives the user input regarding the settings operation, through the input/output device 154, for example, user selection of the "staple" key from the settings operation screen being displayed at the information processing terminal 150.

At S201, the input/output device 154 sends information regarding the set value of the set item based on the user selection, to the operation/display device 156.

At S202, the operation/display device 156 sends information regarding the set value of the set item, to the network communication device 112 of the MFP 110 via the network 102, through the network communication device 152. At S203 and S204, the network communication device 112 transfers the information regarding the set value of the set item to the job configuration manager 116, under control of the network server 114.

In concurrent with sending settings information to the job configuration manager 116, at S205, the operation/display device 156 sends a request for obtaining the predicted execution result, to the prediction model manager 164. More specifically, the request includes settings information that is received at the input/output device 154, such as the selection of the "staple" key.

At S206, the prediction model manager 164 refers to the prediction model to obtain the predicted execution result, and sends a response including the predicted execution result to the operation/display device 156. For example, referring to the prediction model of FIG. 6 or 7A, the prediction model manager 164 obtains a predicted execution result in the cell for the current set value "orientation, cannot read" and the settings operation "staple", that is, the predicted execution result "prohibited". Based on the response from the prediction model manager 164, the operation/display device 156 predicts non-selection of the "staple" key, At S207, the operation/display device 156 sends a request for obtaining attribute data from the attribute data table, to the prediction model manager 164. In this example, the request includes settings information that is received at the input/output device 154, or the predicted execution result obtained at S206.

At S208, the prediction model manager 164 obtains the attribute data from the attribute data table, and sends a response including the attribute data to the operation/display device 156. For example, referring to the attribute data table of FIG. 7B, which may be associated with the table of FIG. 6 or 7, the prediction model manager 164 obtains attribute data indicating "cannot set with current orientation", which is associated with the obtained predicted execution result.

At S209, the operation/display 156 sends the predicted execution result with the attribute data, to the input/output device 154 to display information based on the predicted execution result and the attribute data.

At S210, the input/output device 154 displays the predicted execution result. For example, the operation settings screen may include the predicted execution result with the message "cannot set with current orientation".

In response to the request for settings operation received at S204, at S211, the job configuration manager 116 of the MFP 110 determines whether settings operation can be successfully performed, for example, by analyzing the value to be set with various information obtainable from the memory manager 120, engine manager 122, or user data manager 124.

At S212, the job configuration manager 116 sets the value of the set item according to the settings information received from the user through the information processing terminal 150, based on determination that the settings operation can be successfully performed. In one example, when selection of the "staple" key is successfully performed, such that the set value "staple" is reflected. In case the settings operation cannot be successfully performed, the job configuration manager 116 rejects setting of the value. In one example, when setting of selection of the "staple" key based on the user input fails, the set value is kept at the current set value.

As the set value is reflected, at S213 and S214, the job configuration manager 116 sends a response indicating the actual execution result to the information processing terminal 150 through the network communication device 112 under control of the network server 114, through the network 102. At S215, the network communication device 152 of the information processing terminal 150 transfers the response indicating the actual execution result to the operation/display device 156.

In response to the actual execution result, at S216, the operation/display device 156 compares the predicted execution result with the actual execution result, to determine whether the predicted execution result matches the actual execution result.

At S217, the operation/display device 156 updates the probability match table of FIG. 9A, which may be stored in a memory under control of the prediction model manager 164, based on the determination result indicating whether the predicted execution result matches.

At S218, the operation/display device 156 instructs the input/output device 154 to display the fixed response indicating the actual execution result, that is, the actual set value. At S219, the input/output device 154 displays the actual execution result. In this example, in case the predicted execution result does not match the actual execution result, the input/output device 154 displays the operation settings screen, which includes additional information indicating that the set value is updated to reflect the actual set value. For example, with display of the message "updated to correct value", a display of the "staple" key is changed from the "non-selected status" to the "selected status". In case the predicted execution result matches the actual execution result, the input/output device 154 stops displaying the additional information indicating that selection is tentative, and displays the settings operation screen indicating the set value.

As described above, in one example embodiment, in response to a user input that selects a set value to be set at the MFP 110 through the information processing terminal 150, information regarding settings operation such as the set value is sent to the MFP 110. Concurrently, in prior to receiving the actual execution result of settings operation from the MFP 110, the information processing terminal 150 causes the input/output device 154 to display information based on the predicted execution result of settings operation. With this configuration, even when the response regarding the execution result from the MFP 110 is delayed, the information processing terminal 150 is able to timely respond to the user input.

Further, the predicted execution result is generated based on the prediction model prepared for the MFP 110. Accordingly, the predicted execution result of settings operation tends to match the actual execution result of settings operation, such that information based on the predicted execution result being displayed is not likely to be changed to reflect the actual execution result as their matching rate tends to be high.

Further, the information processing terminal 150 may display additional information indicating that information based on the predicted execution result being displayed is based on prediction. With this additional information indicating display of the predicted execution result, the user is able to instantly know that the information being displayed is the predicted execution result, which may differ from the actual execution result.

In case the predicted execution result does not match the actual execution result, the information processing terminal 150 may display additional information indicating that the information based on the predicted execution result is changed to reflect the actual execution result. With this additional information indicating the change to the actual execution result, the user can instantly recognize that there is a change to reflect the actual execution result.

Further, the information processing terminal 150 may display additional information regarding the predicted execution result based on attribute data, such that the user is able to know more about the user's selection on the set value. For example, the additional information regarding the predicted execution result may indicate that the user's selection on the set value is not selectable. In prior to receiving the fixed response indicating the actual execution result, the information processing terminal 150 is able to notify the user of a possibility of an error. With this additional information regarding the predicted execution result indicating the error, the user does not have to wonder why the user's selection is not selected.

Further, the information processing terminal 150 may collect information regarding the match probability that indicates the probability in which the predicted execution result matches the actual execution result. The information processing terminal 150 may display additional information that reflects the match probability, preferably, together with the predicted execution result in prior to receiving the actual execution result from the MFP 110. With this additional information that reflects the match probability, the user is able to know more about the predicted execution result being displayed such as the possibility that display of the predicted execution result is changed to the actual execution result.

Referring now to FIGS. 12 and 13, an image processing system 100A including the MFP 110 and an information processing terminal 150A is explained according to an example embodiment of the present invention. The image processing system 100A of FIG. 12 is substantially similar in function and operation to the image processing system 100 of FIG. 2, except that the information processing terminal 150A is additionally provided with a prediction model update 168.

The prediction model update 168 updates the prediction model, which is used for predicting the execution result of settings operation to be performed by the MFP 110 according to the user input, based on the match probability regarding the predicted execution result. In one example, the prediction model update 168 updates the prediction model, such as the prediction model of FIG. 6 or 7, based on the match probability managed by the match probability table of FIG. 9. The prediction model update 168 may be implemented by a processor, which operates in cooperation with any desired memory of the information processing terminal 150.

FIG. 13 is a flowchart illustrating operation of updating the prediction model, performed by the prediction model update 168 of the information processing terminal 150A, according to an example embodiment of the present invention. The operation of FIG. 13 is performed in response to execution of the information processing terminal 150.

At S301, the prediction model update 168 determines whether a trigger for updating the prediction model is detected. Examples of a condition at which a trigger is detected include, but not limited to, the time when a user instruction for updating is received, the time when a scheduled update event is to be performed, and the time when a number of performing prediction reaches a threshold value. When it is determined that the trigger is not detected ("NO" at S301), the operation repeats S301. When it is determined that the trigger is detected ("YES" at S301), the operation proceeds to S302 to perform processing of S303 to S305 for a set value of each set item being managed by the prediction model. Alternatively, the user may select one or more set items to be subject for updating.

At S303, the prediction model update 168 obtains a match probability of the set value from the match probability table of FIG. 9A. At S304, the prediction model update 168 determines whether a change condition that is previously set is satisfied based on the obtained match probability. In this example, the change condition is a previously set criterion, which indicates the need for changing the prediction model so as to improve the match probability when the match probability is low. For example, the change condition may be set based on a total number of performing prediction of a set item such as 30 times or more, a value of the match probability such as the value less than 20%, or a combination of the total number of prediction and the value of match probability.

When it is determined that the change condition is satisfied at S304 ("YES" at S304), the operation proceeds to S305.

At S305, the prediction model update 168 updates the prediction model table according to a previously set rule. For example, when the match probability of the predicted execution result "prohibited" is less than a threshold, the value of the prediction model table of FIG. 6 is changed from "prohibited" to "OK". In another example, when the match probability of the predicted execution result "OK" is less than a threshold, the value of the prediction model table of FIG. 6 is changed from "OK" to "prohibited".

As described above, in the image processing system 100A of FIG. 12, when the match probability is low, the information processing terminal 150 updates the prediction model to improve the prediction accuracy. The prediction model is updated based on the actual operation history of the MFP 110, such that the prediction model reflects the actual environments under which the MFP 110 operates.

Referring now to FIG. 14, a hardware structure of the information processing terminal 150 is explained according to an example embodiment of the present invention. In this example, the information processing terminal 150 may be implemented by, for example, a tablet PC.

The information processing terminal 150 includes a mobile processor 10, a memory 12, a flash memory 14, a removable memory slot 16, a touch screen controller 18, a display interface 20, a display 22, a video interface 24, a camera interface 26, a camera 28, a sound codec 30, a sound switch 32, a wirelss LAN port 34, a NFC port 36, and a power control unit 38.

The mobile processor 10 includes a single core or a multi-core central processing unit (CPU), a GPU, a baseband processor, and a memory controller, etc., which may be integrated to form a System on Chip (SoC). The memory 12 may be implemented by a lower-power double daterate (LPDDR) SDRAM, which is connected to the mobile processor 10 to function as a work area for the CPU. The flash memory 14 stores therein various programs such as an operating system (OS) for controlling the information processing terminal 150, a control program that provides the above-described function of controlling display of a user interface, various system data, or various settings data. To the removable memory slot 16, a removable memory such as a SD card may be inserted. The removable memory may store therein user data.

The mobile processor 10 is connected to the display 22, which is provided with a touch screen sensor, via the touch screen controller 18 and the display interface 20. The display 22 displays various screens, such as any one of the above-described settings operation screens. The video interface 24 connected to the mobile processor 10 outputs a video signal, and may be implemented by a high-definition multimedia interface (HDMI). The video interface 24 may be connected to an external display or a projector to output the video signal.

The camera 28 may be implemented by an imaging sensor such as a complementary metal oxide semiconductor (CMOS). The camera 28 is connected to the mobile processor 10 through the camera interface 26.

The sound codec 30 encodes or decodes sounds. The sound switch 32 switches sounds output through a head phone or a speaker.

The mobile processor 10 is connected to ports that allow communication with the external apparatus via a wireless network, such as the wireless LAN port 34 and the NFC port 36. Through the NFC port 36, data may be communicated using the Bluetooth. In this example, the information processing terminal 150 is connected to the network 120, via the wireless LAN port 34 and the NFC port 36, or a wired interface device.

The power control unit 38 controls electric power supply from an external power source or a battery.

In this example, at the information processing terminal 150, the CPU of the mobile processor 10 reads the control program from the flash memory 14 onto a working area of the memory 12, to perform any one of the above-described functions or operations.

More specifically, the network communication device 152 corresponds to the wireless LAN port 34 and the NFC 36. The input/output device 154 corresponds to at least the display 22. The operation/display device 156 corresponds to the mobile processor 10, which controls the display 22 through the touch screen controller 18 and the display interface 20, according to the control program in the memory 12. The prediction model manager 164 corresponds to the mobile processor 10, which controls any desired memory such as the flash memory 14 or the removable memory according to the control program in the memory 12.

As described above, in response to a user input regarding settings operation to be performed on the MFP 110, the information processing terminal 150 timely displays a predicted execution result of settings operation, in prior to receiving a response indicating an actual execution result of settings operation from the MFP 110.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

In the above-described example embodiments, the components 152 to 168 of FIGS. 2 and 12 are provided in the information processing terminal 150. Alternatively, any one of the components 152 to 168 may be provided in a plurality of apparatuses such that they may be distributed over a network.

For example, the match probability manager 166, the prediction model manager 164, and the prediction model update 168 may be provided in one or more server apparatuses, separately from the information processing terminal 150. In such case, the request and the response are communicated via the network.

In another example, the predictor 162 may be provided at an information processing apparatus, which transmits a predicted execution result to the information processing terminal 150 in response to settings information received from the information processing terminal 150.

Moreover, in alternative to instructing the MFP 110 to perform settings operation of setting a set value of an item on the MFP 110, the user at the information processing terminal 150 may instruct the MFP 110 to perform operation other than the above-described example, as long as execution of such operation at the MFP 110 would be reflected on the display of the information processing terminal 150. In such case, the prediction model may be stored based on various information regarding the specific operation to be performed on the MFP 110.

Further, any of the above-described devices or units can be implemented as a hardware apparatus, such as a special-purpose circuit or device, or as a hardware/software combination, such as a processor executing a software program.

Further, as described above, any one of the above-described functions or methods of the present invention may be embodied in the form of a computer program stored in any kind of recording medium that may be removable. For example, any one of the above-described functions or methods may be performed according to a computer executable program, which may be written in any desired legacy programming language such as assembler, C, C++, C#, and Java, or objected-oriented programming language. Examples of recording mediums include, but are not limited to, ROM, EEPROM, EPROM, flash memory, flexible disk, CD-ROM, CD-RW, DVD-ROM, DVD-RAM, DVD-RW, blue ray disc, SD card, MO, etc. Alternatively, such program may be distributed over the network to be downloaded onto the information processing terminal 150.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cashe memory of the CPU, and the RAM may function as a physical memory or a primary memory of the apparatus, while the HDD may function as a secondary memory of the apparatus.

What is claimed is:

1. An information processing apparatus configured to communicate with an information apparatus via a network, the information processing apparatus comprising:
   an input device configured to receive a user input that instructs a specific operation to be performed on the information apparatus;
   a communication device configured to transmit information regarding the specific operation instructed by the user input to the information apparatus via the network;
   a processor configured to predict an execution result of the specific operation to be performed on the information apparatus in response to the user input of the specific operation to generate a predicted execution result;
   a display configured to display information reflecting the predicted execution result in response to the user input of the specific operation, prior to receiving a response including the execution result of the specific operation that is performed on the information apparatus from the information apparatus via the network; and
   a memory configured to store a prediction model, which associates a current status of the information apparatus with a predicted status of the information apparatus after performing the specific operation, and to store a match probability indicating a probability in which the predicted execution result matches the execution result based on previously-performed predictions, in association with a corresponding specific operation that has been performed on the information apparatus, wherein
   the processor obtains the predicted execution result using the prediction model,
   the prediction model further associates attribute data regarding the predicted status,
   the display further displays additional information based on the attribute data, together with the information reflecting the predicted execution result, and
   the display further displays additional information regarding the match probability associated with the specific operation to be performed.

2. The information processing apparatus of claim 1,
wherein the communication device is further configured to receive the response including the execution result from the information apparatus in response to the information regarding the specific operation transmitted to the information apparatus, and
wherein the processor compares the predicted execution result and the execution result to obtain a difference, and updates the display of the information reflecting the predicted execution result with the execution result based on the difference.

3. The information processing apparatus of claim 2, wherein, when the display of the information reflecting the predicted execution result is updated to reflect the execution result, the display displays additional information indicating that the information reflecting the predicted execution result that has been displayed is changed to reflect the execution result.

4. The information processing apparatus of claim 1, wherein the display displays additional information indicating that the information reflecting the predicted execution result is based on prediction.

5. The information processing apparatus of claim 1, wherein the processor is further configured to update the prediction model to be used for obtaining the predicted execution result.

6. An information processing system, comprising:
the information processing apparatus of claim 1; and
the information apparatus, including:
another communication device configured to receive a request including the information regarding the specific operation instructed by the user input;
another processor configured to perform the specific operation on the information apparatus according to the user input to generate the execution result, and to cause the another communication device to transmit the response including the execution result to the information processing apparatus.

7. The information processing apparatus of claim 1, wherein, when the specific operation instructed by the user input is an operation of setting a value to a specific value to process data using the information apparatus and when the processor predicts that the value cannot be set to the specific value, the display displays information indicating that the operation of setting the value cannot be performed on the information apparatus.

8. A method of controlling a display of information regarding an information apparatus through an information processing apparatus, the method comprising:
receiving a user input that instructs a specific operation to be performed on the information apparatus;
transmitting information regarding the specific operation instructed by the user input to the information apparatus via a network;
predicting an execution result of the specific operation to be performed on the information apparatus in response to the user input of the specific operation to generate a predicted execution result;
displaying information reflecting the predicted execution result in response to the user input of the specific operation, prior to receiving a response including the execution result of the specific operation that is performed on the information apparatus from the information apparatus via the network;
storing a prediction model, which associates a current status of the information apparatus with a predicted status of the information apparatus after performing the specific operation;
displaying additional information based on attribute data, together with the information reflecting the predicted execution result;
storing a match probability indicating a probability in which the predicted execution result matches the execution result based on previously-performed predictions, in association with a corresponding specific operation that has been performed on the information apparatus; and
displaying additional information regarding the match probability associated with the specific operation to be performed, wherein
the predicted execution result is obtained using the prediction model, and
the prediction model further associates the attribute data regarding the predicted status.

9. The method of claim 8, further comprising:
receiving the response including the execution result from the information apparatus in response to the information regarding the specific operation transmitted to the information apparatus;
comparing the predicted execution result and the execution result to obtain a difference; and
updating the display of the information reflecting the predicted execution result with the execution result based on the difference.

10. The method of claim 9, further comprising:
displaying additional information indicating that the information reflecting the predicted execution result that has been displayed is changed to reflect the execution result when the display of the information reflecting the predicted execution result is updated to reflect the execution result.

11. The method of claim 8, further comprising:
displaying additional information indicating that the information reflecting the predicted execution result is based on prediction.

12. The method of claim 8, further comprising:
updating the prediction model to be used for obtaining the predicted execution result.

13. A non-transitory computer-readable storage medium storing computer-readable instructions that, when executed by a computer, cause the computer to execute a method of controlling a display of information regarding an information apparatus through an information processing apparatus, the method comprising:
receiving a user input that instructs a specific operation to be performed on the information apparatus;
transmitting information regarding the specific operation instructed by the user input to the information apparatus via a network;
predicting an execution result of the specific operation to be performed on the information apparatus in response to the user input of the specific operation to generate a predicted execution result;
displaying information reflecting the predicted execution result in response to the user input of the specific operation, prior to receiving a response including the execution result of the specific operation that is performed on the information apparatus from the information apparatus via the network;

storing a prediction model, which associates a current status of the information apparatus with a predicted status of the information apparatus after performing the specific operation;

displaying additional information based on attribute data, together with the information reflecting the predicted execution result;

storing a match probability indicating a probability in which the predicted execution result matches the execution result based on previously-performed predictions, in association with a corresponding specific operation that has been performed on the information apparatus; and displaying additional information regarding the match probability associated with the specific operation to be performed, wherein the predicted execution result is obtained using the prediction model, and the prediction model further associates the attribute data regarding the predicted status.

* * * * *